(12) United States Patent
McCullough et al.

(10) Patent No.: US 7,353,602 B2
(45) Date of Patent: Apr. 8, 2008

(54) INSTALLATION OF SPLICED ELECTRICAL TRANSMISSION CABLES

(75) Inventors: Colin McCullough, Chanhassen, MN (US); Herve E. Deve, Minneapolis, MN (US); Todd N. Staffaroni, Wyoming, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/276,607

(22) Filed: Mar. 7, 2006

(65) Prior Publication Data

US 2007/0209203 A1   Sep. 13, 2007

(51) Int. Cl.
*H01R 43/00* (2006.01)

(52) U.S. Cl. ............... 29/869; 29/825; 29/868

(58) Field of Classification Search ........... 29/825, 29/868, 869
See application file for complete search history.

(56) References Cited

U.S. PATENT DOCUMENTS

| | | | |
|---|---|---|---|
| 3,450,829 A * | 6/1969 | Paul ............... | 174/89 |
| 3,709,706 A | 1/1973 | Sowman | |
| 3,795,524 A | 3/1974 | Sowman | |
| 3,934,397 A | 1/1976 | Black | |
| 4,047,965 A | 9/1977 | Karst et al. | |
| 4,164,620 A * | 8/1979 | Hervig ............ | 174/73.1 |
| 4,241,004 A * | 12/1980 | Hervig ............ | 264/262 |
| 4,427,262 A * | 1/1984 | Oldham ............ | 385/71 |
| 4,504,695 A | 3/1985 | Fontaine et al. | |
| 4,785,139 A * | 11/1988 | Lynch et al. ...... | 174/70 S |
| 4,954,462 A | 9/1990 | Wood et al. | |
| 4,965,411 A * | 10/1990 | Bruneval ......... | 174/89 |
| 5,171,942 A | 12/1992 | Powers | |
| 5,185,299 A | 2/1993 | Wood et al. | |
| 5,315,682 A * | 5/1994 | Daguet et al. .... | 385/95 |
| 5,501,906 A | 3/1996 | Deve | |
| 5,554,826 A | 9/1996 | Gentry | |
| 6,180,232 B1 | 1/2001 | McCullough et al. | |
| 6,329,056 B1 | 12/2001 | Deve et al. | |
| 6,344,270 B1 | 2/2002 | McCullough et al. | |
| 6,485,796 B1 | 11/2002 | Carpenter et al. | |
| 6,505,818 B1 | 1/2003 | Nimiya et al. | |

(Continued)

FOREIGN PATENT DOCUMENTS

JP   2001-103649   4/2001

(Continued)

OTHER PUBLICATIONS

"Stringing Equipment Total Solutions," Condux Equipment and Accessories for High Voltage Power Lines, Tesmec Cover Joints, Edition 3, Sep. 2004, pp. 1-3.

(Continued)

*Primary Examiner*—Carl J. Arbes
(74) *Attorney, Agent, or Firm*—Gregory D. Allen; James A. Baker

(57) ABSTRACT

A method of installing an electrical transmission cable includes providing an electrical transmission cable extending from a first end to a second end. The cable includes a flexible, full tension splice between the first end and the second end. Additionally, the electrical transmission cable includes at least one composite wire. Additionally, the flexible, full tension splice is pulled over a first sheave assembly.

13 Claims, 7 Drawing Sheets

U.S. PATENT DOCUMENTS

| | | |
|---|---|---|
| 6,559,385 B1 | 5/2003 | Johnson et al. |
| 6,692,842 B2 | 2/2004 | McCullough et al. |
| 6,723,451 B1 | 4/2004 | McCullough et al. |
| 6,796,365 B1 | 9/2004 | McCullough et al. |
| 6,913,838 B2 | 7/2005 | McCullough et al. |
| 7,003,201 B2 * | 2/2006 | Dapelo et al. .............. 385/109 |
| 2004/0190733 A1 | 9/2004 | Nayar et al. |
| 2005/0178000 A1 | 8/2005 | McCullough et al. |
| 2005/0181228 A1 | 8/2005 | McCullough et al. |
| 2005/0279074 A1 | 12/2005 | McCullough et al. |
| 2005/0279526 A1 | 12/2005 | McCullough et al. |
| 2005/0279527 A1 | 12/2005 | McCullough et al. |

FOREIGN PATENT DOCUMENTS

| | | |
|---|---|---|
| KR | 10-2001-0091852 | 10/2001 |
| WO | WO 03/091008 | 11/2003 |
| WO | WO 2005/040017 | 5/2005 |

OTHER PUBLICATIONS

ACA Conductor Accessories, ACA Telecommunications, 2003, pp. 1-82.

Section 3—Transmission: Splices, Preformed Line Products, pp. (3-1)-(3-20), (2005 catalogue).

Splice: Full Tension, Preformed Line Products, Feb. 1997, pp. 1-4.

THERMOLIGN Splice, Preformed Line Products, Feb. 2005, pp. 1-2.

* cited by examiner

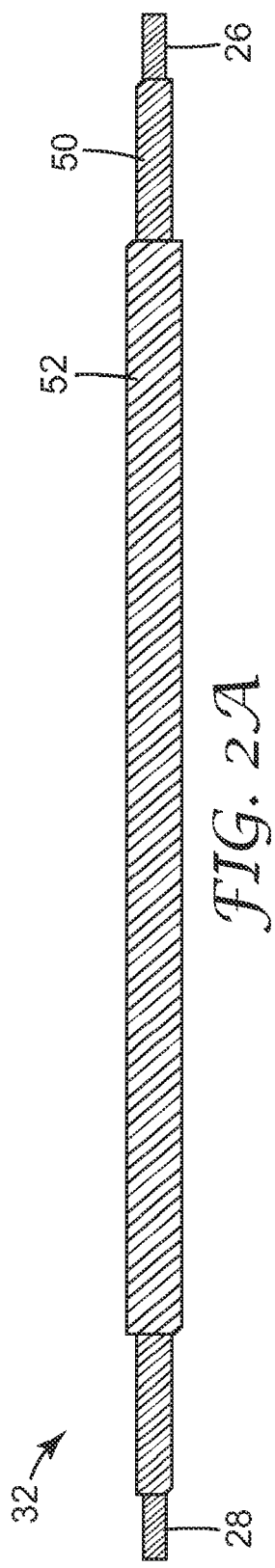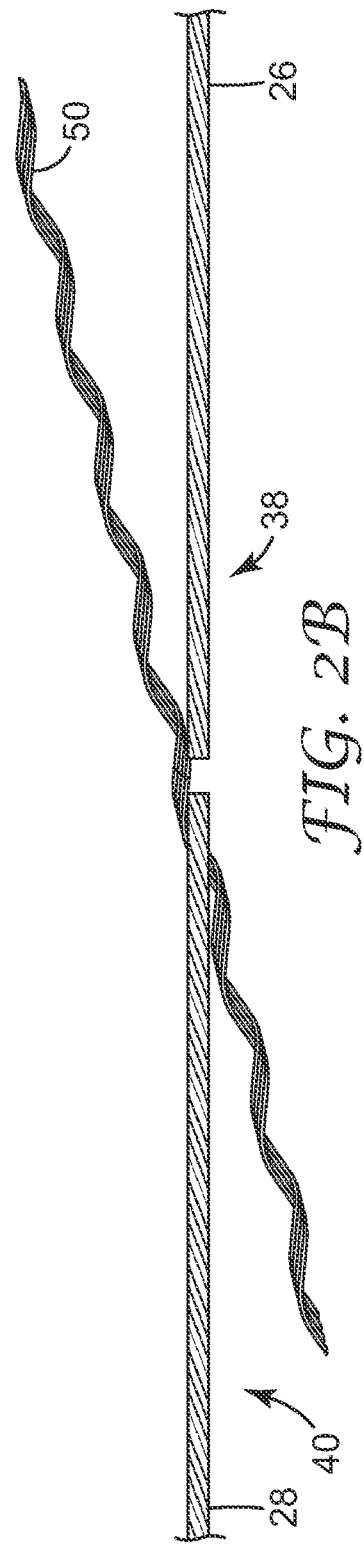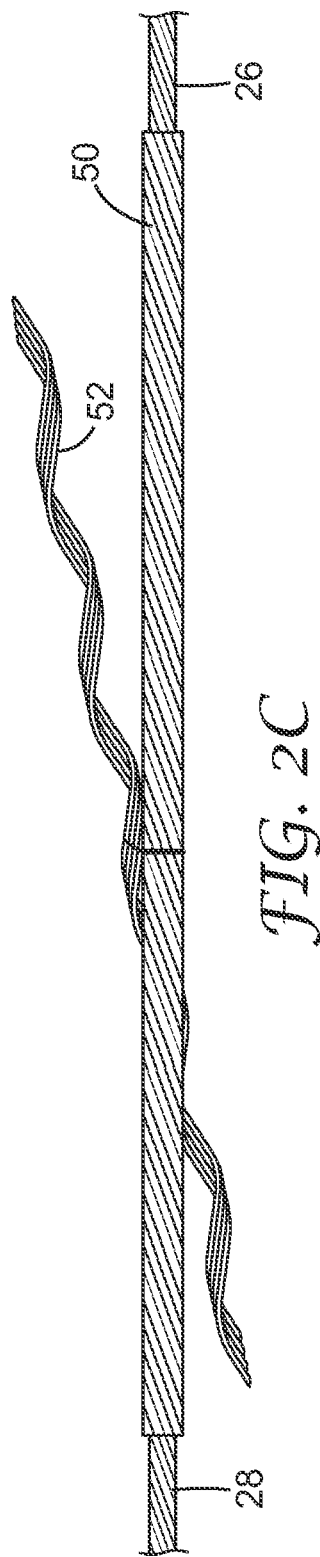

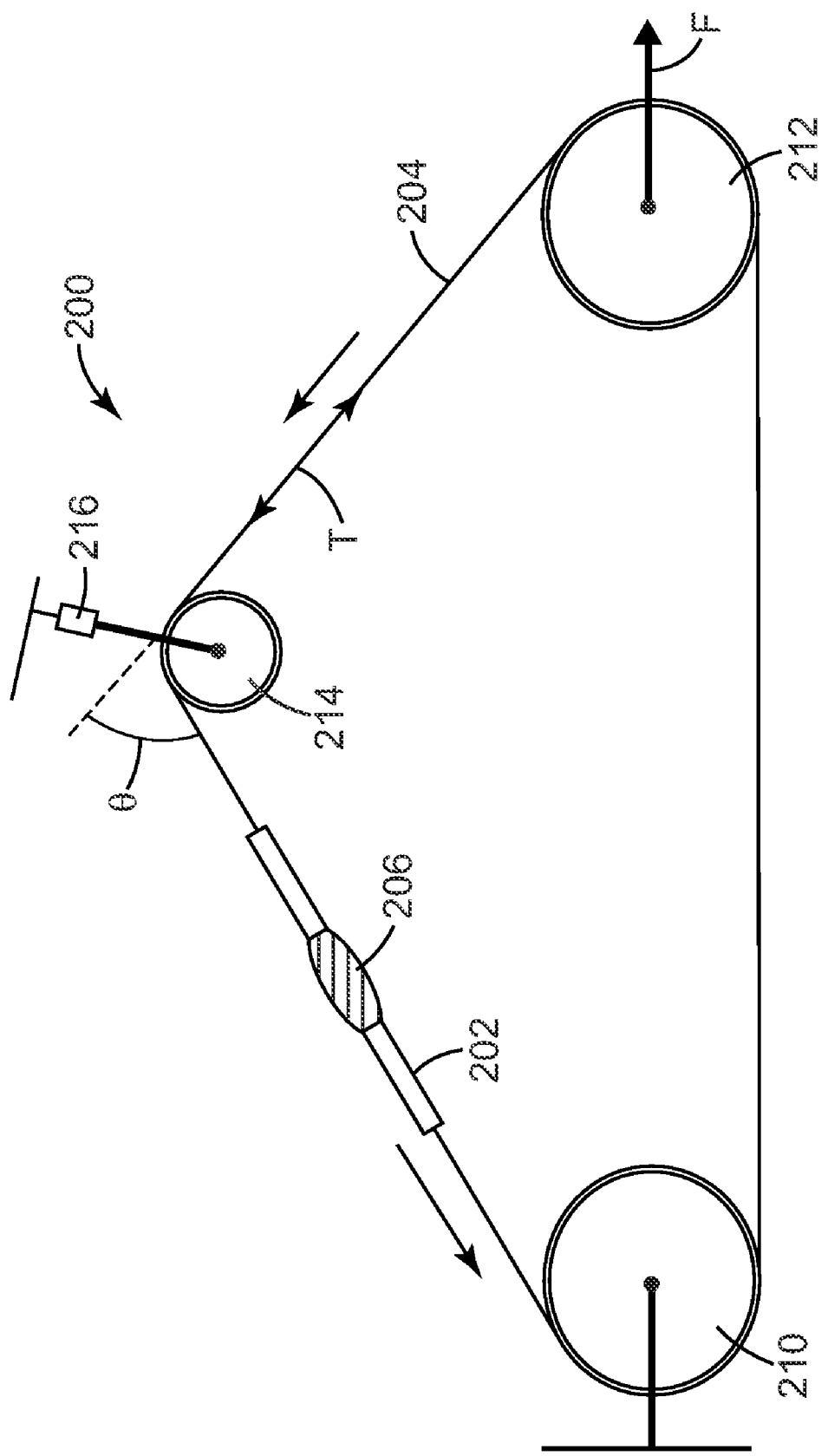

INSTALLATION OF SPLICED ELECTRICAL TRANSMISSION CABLES

BACKGROUND

Composite wires typically include a matrix material reinforced with substantially continuous, longitudinally extending fibers. Examples of composite wires include a metal or polymer matrix material reinforced with fibers (e.g., carbon and ceramic fibers). The use of some composite wires in overhead electrical power transmission cables is of particular interest. Many embodiments of such wires can provide greater power transfer than traditional transmission cables and have thereby allowed increased power transfer capacity with existing electrical transmission infrastructures.

During installation, transmission cable is typically provided on a supply reel and pulled from the reel over a series of sheaves hanging from suspension towers. Care is taken when pulling or otherwise tensioning the cable over the sheave assemblies to avoid bending the cable to a radius less than the minimum bend radius, as excessive tension while bending the cable can result in damage to the cable core, for example. Generally, the amount of bending that is tolerated decreases as the cable tension increases. The minimum bend strength of transmission cables including composite wires, however, is typically higher than for traditional transmission cables not utilizing composite wires.

Additionally, electrical transmission cable is not available in infinite lengths, and as such a series of electrical transmission cables is periodically connected end-to-end (i.e., spliced) in order to provide a sufficiently long span of cable. It is desirable for splices in an installed electrical transmission cable to be full tension splices. Further, it is desirable to connect ends of a series of cables with full tension splices prior to pulling the transmission cable over the sheave assemblies.

Splices used for conventional electrical transmission cables having steel core wires are typically rigid compression splices formed of aluminum and steel tubing. The rigidity of such compression splices prevents the splices from being pulled over sheaves without a high risk of either permanently bending, deforming, or otherwise causing stress damage to the splice itself or a risk of damaging the spliced cable, for example where it transitions into the rigid splice. In particular, "pinch points," or other small bending radius points are formed at ends of the rigid splice, thereby giving rise to a high risk of transmission cable damage.

In order to reduce such effects, a splice cover formed of an aluminum tube with rubber bushings at each end of the tube is sometimes disposed over these rigid splices to help reduce damage to the rigid splice and spliced steel core cable. However, this practice is seldom used with steel core cables due to a remaining risk of damage.

More flexible, full tension splices, such as formed-wire type splices, have been used to connect composite wire cables. However, methods of pulling such flexible, full tension splices over sheave assemblies have not previously been recognized or employed. In particular, instead of pulling a flexible, full tension splice over sheaves, unspliced cable is pulled over the sheaves, and later spliced. Other methods of connecting the composite wire cables during installation are employed, such as using temporary wire mesh grips, also described as sock splices, to provide a temporary mechanical connection between lengths of electrical transmission cable while the transmission cable is being strung over the sheave assemblies.

The connections formed using these wire mesh grips are relatively low strength in comparison with rated breaking strengths of the cable itself and do not provide any electrical connection. Additionally, even with this type of wire mesh grip connection, there are limits as to angle, tension, and sheave diameter for which the mesh grip connection and connected lengths of cable can be effectively pulled into position over a sheave assembly. For example, damage to the cable at the edges of the wire mesh grip is possible during installation.

Following positioning of the transmission cable over the sheaves, the wire mesh grips are typically replaced with permanent, full-tension splices used to join the lengths of cable. However, later installation of the splices following positioning of the transmission cable adds installation steps (including additional equipment, time, and other costs) and can be problematic, for example, where the installer does not have the necessary field access required to install a splice mid-span between lengths of cable.

SUMMARY

One aspect of the invention described herein provides a method of installing an electrical transmission cable. In one embodiment according to the invention, a method of installing an electrical transmission cable includes providing a first cable including at least one composite wire. The first cable has a first end and a second end. A second cable is also provided. The second cable includes at least one composite wire. The second cable also has a first end and a second end. Each of the composite wires of the first and second cables includes a plurality of substantially continuous, longitudinally extending fibers in a matrix material. The second end of the first cable is joined to the first end of the second cable using a flexible, full tension splice. The first end of the first cable is guided over a first sheave assembly and is pulled over the first sheave assembly to the second end of the first cable.

In another embodiment according to the invention, a method of installing an electrical transmission cable includes providing an electrical transmission cable extending from a first end to a second end. The cable includes a flexible, full tension splice between the first end and the second end. The electrical transmission cable includes at least one tow of substantially continuous, longitudinally positioned fibers in a matrix. Additionally, the flexible, full tension splice is pulled over a first sheave assembly.

Surprisingly, Applicants have discovered the ability to install, via a sheave assembly, electrical transmission cable having flexible, full tension splice wherein the cable includes at least one tow of substantially continuous, longitudinally positioned fibers in a matrix, with no significant damage to the cable and splice.

BRIEF DESCRIPTION OF THE DRAWINGS

The present invention will be further described with reference to the accompanying drawings wherein like reference numerals refer to like parts in the several views, and wherein:

FIGS. 2A-2C illustrate an exemplary flexible, full tension splice from a front view.

FIG. 9 is a schematic view of an exemplary test apparatus for testing splices pulled over a test sheave in accordance with the present invention.

DETAILED DESCRIPTION

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
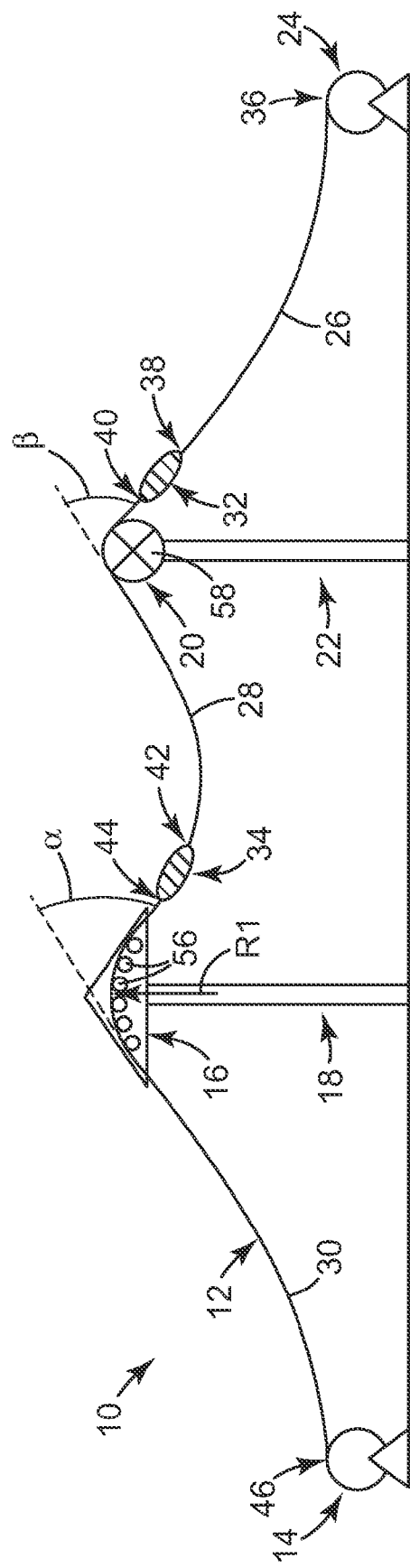
FIG. 1 is a schematic view of a method of installing electrical transmission cable according to one exemplary embodiment of the invention.

Referring to FIG. 1, there is shown exemplary cable installation system 10 for stringing transmission cable 12 in an overhead configuration. System 10 includes tensioner 14 for feeding transmission cable 12 under tension, first sheave assembly 16 maintained by first suspension tower 18, second sheave assembly 20 maintained by second suspension tower 22, and tugger 24 for pulling transmission cable 12 from tensioner 14 and over first and second sheave assemblies 16, 20. While only two sheave assemblies are shown, it should be understood that system 10 optionally includes any desired number of additional sheave assemblies maintained by corresponding suspension towers or other appropriate structures.

In one exemplary embodiment, transmission cable 12 includes first cable 26, second cable 28, and third cable 30. Transmission cable 12 also includes first splice 32 joining first and second cables 26, 28, and second splice 34 joining second and third cables 28, 30. First cable 26 extends from leading end 36 maintained by tugger 24 to trailing end 38 partially disposed in first splice 32. Second cable 28 extends from leading end 40 partially disposed in first splice 32 to trailing end 42 partially disposed in second splice 34. Third cable 30 similarly extends from leading end 44 partially disposed in second splice 34 to trailing end 46 maintained by tensioner 14. In one exemplary embodiment, each of first, second, and third cables 26, 28, 30 is at least about 980 feet (about 300 meters) in length, although other dimensions are contemplated. In some embodiments, each of the first, second, and third cables 26, 28, 30 is at least about 1000, 2000, 3000, 4000, 5000, 6000, 7000, 8000, 9000, or even at least about 10,000 feet in length.

Additionally, and as will be described in greater detail below with reference to FIGS. 3-6, a transmission cable, including each of first, second, and third cables, includes at least one composite wire including a plurality of substantially continuous, longitudinally extending reinforcing fibers in a matrix material.

Typically the fraction of core (i.e., the fraction of core relative to the whole cable as expressed with respect to the cable cross-section as an area fraction of the core to whole cable) is in a range from about 5% to 30%. In some embodiments the fraction of core relative to the whole cable is at least 2%, at least 5%, 8%, 10%, 12%, 15%, 18%, 20%, 22%, 25%, 30%, 35%, 40%, 45%, 50%, or even at least 60%.

Exemplary matrix materials include metal matrix materials such as aluminum, titanium, zinc, tin, magnesium, and alloys thereof (e.g., an alloy of aluminum and copper), and polymeric matrix materials such as epoxies, esters, vinyl esters, polyimides, polyesters, cyanate esters, phenolic resins, bismaleimide resins and thermoplastics.

Examples of suitable continuous (i.e., having a length that is relatively infinite when compared to the average fiber diameter) fibers for making composite wires include aramid fibers, boron fibers, carbon fibers, ceramic fibers, graphite fibers, poly(p-phenylene-2,6-benzobisoxazole), tungsten fibers, and shape memory alloy (i.e., a metal alloy that undergoes a Martensitic transformation such that the metal alloy is deformable by a twinning mechanism below the transformation temperature, wherein such deformation is reversible when the twin structure reverts to the original phase upon heating above the transformation temperature) fibers. Ceramic fibers include glass, silicon carbide fibers, and ceramic oxide fibers. Typically, the ceramic fibers are crystalline ceramics (i.e., exhibits a discernible X-ray powder diffraction pattern) and/or a mixture of crystalline ceramic and glass (i.e., a fiber may contain both crystalline ceramic and glass phases), although they may also be glass. In some embodiments, the fiber is at least 50 (in some embodiments, at least 55, 60, 65, 70, 75, 80, 85, 90, 95, 96, 97, 98, 99, or even 100) percent by weight crystalline. Examples of suitable crystalline ceramic oxide fibers include refractory fibers such as alumina fibers, aluminosilicate fibers, aluminoborate fibers, aluminoborosilicate fibers, zirconia-silica fibers, and combinations thereof.

In some embodiments, it is desirable for the fibers to comprise at least 40 (in some embodiments, at least 50, 60, 65, 70, 75, 80, 85, 90, 95, 96, 97, 98, 99, or even 100) percent by volume $Al_2O_3$, based on the total volume of the fiber. In some embodiments, it is desirable for the fibers to comprise in a range from 40 to 70 (in some embodiments, in a range from 55 to 70, or even 55 to 65) percent by volume $Al_2O_3$, based on the total volume of the fiber.

Further, exemplary glass fibers are available, for example, from Corning Glass, Corning, N.Y. Typically, the continuous glass fibers have an average fiber diameter in a range from about 3 micrometers to about 19 micrometers. In some embodiments, the glass fibers have an average tensile strength of at least 3 GPa, 4 GPa, and or even at least 5 GPa. In some embodiments, the glass fibers have a modulus in a range from about 60 GPa to 95 GPa, or about 60 GPa to about 90 GPa.

Alumina fibers are described, for example, in U.S. Pat. No. 4,954,462 (Wood et al.) and U.S. Pat. No. 5,185,299 (Wood et al.). In some embodiments, the alumina fibers are polycrystalline alpha alumina fibers, and comprise, on a theoretical oxide basis, greater than 99 percent by weight $Al_2O_3$ and 0.2-0.5 percent by weight $SiO_2$, based on the total weight of the alumina fibers. In another aspect, some desirable polycrystalline, alpha alumina fibers comprise alpha alumina having an average grain size of less than 1 micrometer (or even, in some embodiments, less than 0.5 micrometer). In another aspect, in some embodiments, polycrystalline, alpha alumina fibers have an average tensile strength of at least 1.6 GPa (in some embodiments, at least 2.1 GPa, or even, at least 2.8 GPa), as determined according to the tensile strength test described in U.S. Pat. No. 6,460,597 (McCullough et al.). Exemplary alpha alumina fibers are marketed under the trade designation "NEXTEL 610" by 3M Company, St. Paul, Minn.

Aluminosilicate fibers are described, for example, in U.S. Pat. No. 4,047,965 (Karst et al). Exemplary aluminosilicate fibers are marketed under the trade designations "NEXTEL 440", "NEXTEL 550", and "NEXTEL 720" by 3M Company of St. Paul, Minn.

Aluminumborate and aluminoborosilicate fibers are described, for example, in U.S. Pat. No. 3,795,524 (Sowman). Exemplary aluminoborosilicate fibers are marketed under the trade designation "NEXTEL 312" by 3M Company.

Zirconia-silica fibers as described, for example, in U.S. Pat. No. 3,709,706 (Sowman).

Typically, the continuous ceramic fibers have an average fiber diameter of at least about 5 micrometers, more typically, in a range from about 5 micrometers to about 20 micrometers; and in some embodiments, in a range from about 5 micrometers to about 15 micrometers.

Typically, the ceramic fibers are in tows. Tows are known in the fiber art and typically include a plurality of (individual) generally untwisted fibers (typically at least 100 fibers, more typically at least 400 fibers). In some embodiments, tows comprise at least 780 individual fibers per tow, and in some cases, at least 2600 individual fibers per tow, or at least 5200 individual fibers per tow. Tows of various ceramic fibers are available in a variety of lengths, including 300 meters, 500 meters, 750 meters, 1000 meters, 1500 meters, and longer. The fibers may have a cross-sectional shape that is circular, elliptical, or dogbone.

Exemplary boron fibers are commercially available, for example, from Textron Specialty Fibers, Inc. of Lowell, Mass. Typically, such fibers have a length on the order of at least 50 meters, and may even have lengths on the order of kilometers or more. Typically, the continuous boron fibers have an average fiber diameter in a range from about 80 micrometers to about 200 micrometers. More typically, the average fiber diameter is no greater than 150 micrometers, most typically in a range from 95 micrometers to 145 micrometers. In some embodiments, the boron fibers have an average tensile strength of at least 3 GPa, and or even at least 3.5 GPa. In some embodiments, the boron fibers have a modulus in a range from about 350 GPa to about 450 GPa, or even in a range from about 350 GPa to about 400 GPa.

Further, exemplary silicon carbide fibers are marketed, for example, by COI Ceramics of San Diego, Calif. under the trade designation "NICALON" in tows of 500 fibers, from Ube Industries of Japan, under the trade designation "TYRANNO", and from Dow Corning of Midland, Mich. under the trade designation "SYLRAMIC".

Exemplary silicon carbide monofilament fibers are marketed, for example, by Specialty Materials, Inc., Lowell, Mass. under the trade designation "SCS-9", "SCS-6", and "Ultra-SCS".

Carbon fibers are available, for example, from Amoco Chemicals of Alpharetta, Ga. under the trade designation "THORNEL CARBON" in tows of 2000, 4000, 5000, and 12,000 fibers, Hexcel Corporation of Stamford, Conn., from Grafil, Inc. of Sacramento, Calif. (subsidiary of Mitsubishi Rayon Co.) under the trade designation "PYROFIL", Toray of Tokyo, Japan, under the trade designation "TORAYCA", Toho Rayon of Japan, Ltd. under the trade designation "BESFIGHT", Zoltek Corporation of St. Louis, Mo. under the trade designations "PANEX" and "PYRON", and Inco Special Products of Wyckoff, N.J. (nickel coated carbon fibers), under the trade designations "12K20" and "12K50". Typically, the continuous carbon fibers have an average fiber diameter in a range from about 4 micrometers to about 12 micrometers, about 4.5 micrometers to about 12 micrometers, or even about 5 micrometers to about 10 micrometers.

Exemplary graphite fibers are marketed, for example, by BP Amoco of Alpharetta, Ga., under the trade designation "T-300", in tows of 1000, 3000, and 6000 fibers. Typically, such fibers have a length on the order of at least 50 meters, and may even have lengths on the order of kilometers or more. Typically, the continuous graphite fibers have an average fiber diameter in a range from about 4 micrometers to about 12 micrometers, about 4.5 micrometers to about 12 micrometers, or even about 5 micrometers to about 10 micrometers. In some embodiments, the graphite fibers have an average tensile strength of at least 1.5 GPa, 2 GPa, 3 GPa, or even at least 4 GPa. In some embodiments, the graphite fibers have a modulus in a range from about 200 GPa to about 1200 GPa, or even about 200 GPa to about 1000 GPa.

Exemplary tungsten fibers are available, for example, from California Fine Wire Company, Grover Beach, Calif. Typically, such fibers have a length on the order of at least 50 meters, and may even have lengths on the order of kilometers or more. Typically, the continuous tungsten fibers have an average fiber diameter in a range from about 100 micrometers to about 500 micrometers about 150 micrometers to about 500 micrometers, or even from about 200 micrometers to about 400 micrometers. In some embodiments, the tungsten fibers have an average tensile strength of at least 0.7 GPa, 1 GPa, 1.5 GPa, 2 GPa, or even at least 2.3 GPa. In some embodiments, the tungsten fibers have a modulus greater than 400 GPa to approximately no greater than 420 GPa, or even no greater than 415 GPa.

Exemplary shape memory alloy fibers are available, for example, from Johnson Matthey, West Whiteland, Pa. Typically, such fibers have a length on the order of at least 50 meters, and may even have lengths on the order of kilometers or more. Typically, the continuous shape memory alloy fibers have an average fiber diameter in a range from about 50 micrometers to about 400 micrometers, about 50 to about 350 micrometers, or even about 100 micrometers to 300 micrometers. In some embodiments, the shape memory alloy fibers have an average tensile strength of at least 0.5 GPa, and or even at least 1 GPa. In some embodiments, the shape memory alloy fibers have a modulus in a range from about 20 GPa to about 100 GPa, or even from about 20 GPA to about 90 GPa.

Exemplary aramid fibers are available, for example, from DuPont, Wilmington, Del. under the trade designation "KEVLAR". Typically, such fibers have a length on the order of at least 50 meters, and may even have lengths on the order of kilometers or more. Typically, the continuous aramid fibers have an average fiber diameter in a range from about 10 micrometers to about 15 micrometers. In some embodiments, the aramid fibers have an average tensile strength of at least 2.5 GPa, 3 GPa, 3.5 GPa, 4 GPa, or even at least 4.5 GPa. In some embodiments, the aramid fibers have a modulus in a range from about 80 GPa to about 200 GPa, or even about 80 GPa to about 180 GPa.

Exemplary poly(p-phenylene-2,6-benzobisoxazole) fibers are available, for example, from Toyobo Co., Osaka, Japan under the trade designation "ZYLON". Typically, such fibers have a length on the order of at least 50 meters, and may even have lengths on the order of kilometers or more. Typically, the continuous poly(p-phenylene-2,6-benzobisoxazole) fibers have an average fiber diameter in a range from about 8 micrometers to about 15 micrometers. In some embodiments, the poly(p-phenylene-2,6-benzobisoxazole) fibers have an average tensile strength of at least 3 GPa, 4 GPa, 5 GPa, 6 GPa, or even at least 7 GPa. In some embodiments, the poly(p-phenylene-2,6-benzobisoxazole) fibers have a modulus in a range from about 150 GPa to about 300 GPa, or even about 150 GPa to about 275 GPa.

Aramid, carbon, graphite, ceramic, poly(p-phenylene-2,6-benzobisoxazole) fibers (including tows of fibers) typically include an organic sizing material on at least a portion of the outer surfaces of at least some of the ceramic oxide fibers. Typically, the sizing material provides an add-on weight in a range from 0.5 to 10 percent by weight. The sizing material has been observed to provide lubricity and to protect the fiber strands during handling. It is believed that the sizing tends to reduce the breakage of fibers, reduces static electricity, and reduces the amount of dust during, for example, conversion to a fabric. The sizing can be removed, for example, by dissolving or burning it away. Preferably, the sizing is removed before forming the matrix composite wire according to the present invention. In this way, before forming the composite wire the fibers are free of any sizing thereon.

Exemplary metals for matrix materials are highly pure (e.g., greater than 99.95%) elemental aluminum or alloys of pure aluminum with other elements, such as copper. Typically, the metal matrix material is selected such that the matrix material does not significantly chemically react with the fiber (i.e., is relatively chemically inert with respect to fiber material), for example, to eliminate the need to provide a protective coating on the fiber exterior. Exemplary metal matrix materials include aluminum, zinc, tin, magnesium, and alloys thereof (e.g., an alloy of aluminum and copper). In some embodiments, the matrix material desirably includes aluminum and alloys thereof.

Typically, fibers for metal matrix composites include boron, fibers, carbon fibers, crystalline ceramic containing fibers, graphite fibers, tungsten fibers, and shape memory alloy fibers.

In some embodiments, the metal matrix comprises at least 98 percent by weight aluminum, at least 99 percent by weight aluminum, greater than 99.9 percent by weight aluminum, or even greater than 99.95 percent by weight aluminum. Exemplary aluminum alloys of aluminum and copper comprise at least 98 percent by weight Al and up to 2 percent by weight Cu. In some embodiments, useful alloys are 1000, 2000, 3000, 4000, 5000, 6000, 7000 and/or 8000 series aluminum alloys (Aluminum Association designations). Although higher purity metals tend to be desirable for making higher tensile strength wires, less pure forms of metals are also useful.

Suitable metals are commercially available. For example, aluminum is available under the trade designation "SUPER PURE ALUMINUM; 99.99% Al" from Alcoa of Pittsburgh, Pa. Aluminum alloys (e.g., Al-2% by weight Cu (0.03% by weight impurities)) can be obtained, for example, from Belmont Metals, New York, N.Y. Zinc and tin are available, for example, from Metal Services, St. Paul, Minn. ("pure zinc"; 99.999% purity and "pure tin"; 99.95% purity). For example, magnesium is available under the trade designation "PURE" from Magnesium Elektron, Manchester, England. Magnesium alloys (e.g., WE43A, EZ33A, AZ81A, and ZE41A), titanium, and titanium alloys can be obtained, for example, from TIMET, Denver, Colo.

The composite cores and wires typically comprise at least 15 percent by volume (in some embodiments, at least 20, 25, 30, 35, 40, 45, or even 50 percent by volume) of the fibers, based on the total combined volume of the fibers and matrix material. More typically the composite cores and wires comprise in the range from 40 to 75 (in some embodiments, 45 to 70) percent by volume of the fibers, based on the total combined volume of the fibers and matrix material.

Typically the average diameter of the core is in a range from about 5 mm to about 15 mm. In some embodiments, the average diameter of core desirable is at least 1 mm, at least 2 mm, or even up to about 3 mm. Typically the average diameter of the composite wire is in a range from about 1 mm to 12 mm, 1 mm to 10 mm, 1 to 8 mm, or even 1 mm to 4 mm. In some embodiments, the average diameter of composite wire desirable is at least 1 mm, at least 1.5 mm, 2 mm, 3 mm, 4 mm, 5 mm, 6 mm, 7 mm, 8 mm, 9 mm, 10 mm, 11 mm, or even at least 12 mm.

Techniques for making metal and polymeric matrix composite wires are known in the art. For example, continuous metal matrix composite wire can be made by continuous metal matrix infiltration processes. One suitable process is described, for example, in U.S. Pat. No. 6,485,796 (Carpenter et al.), the disclosure of which is incorporated herein by reference. Other processing routes for continuous fiber reinforced metal matrix composites are, for example, discussed in ASM Handbook Vol. 21, Composites, pp. 584-588 (ASM International, Metals Park, Ohio), published in 2001, the disclosure of which is incorporated herein by reference.

Further, for example, techniques for making metal matrix composite wires include those discussed, for example, in U.S. Pat. No. 5,501,906 (Deve), U.S. Pat. No. 6,180,232 (McCullough et al.), U.S. Pat. No. 6,245,425 (McCullough et al.), U.S. Pat. No. 6,336,495 (McCullough Ct al.), U.S. Pat. No. 6,544,645 (McCullough et al.), U.S. Pat. No. 6,447,927 (McCullough et al.), U.S. Pat. No. 6,460,597 (McCullough et al.), U.S. Pat. No. 6,329,056 (Deve et al.), U.S. Pat. No. 6,344,270 (McCullough et al.), U.S. Pat. No. 6,485,796 (Carpenter et al.). U.S. Pat. No. 6,559,385 (Johnson et al.), U.S. Pat. No. 6,796,365 (McCullough et al.), U.S. Pat. No. 6,723,451 (McCullough et al.), U.S. Pat. No. 6,692,842 (McCullough et al.), U.S. Pat. No. 6,913,838 (McCullough et al.), U.S. Pat. No. 7,131,308 (McCullough et al.), U.S. Pat. No. 7,093,416 (Johnson et al.); and U.S. Pat. Application Publication Nos. US 2004/0190733 A1, US 2005/0181228 A1, US 2006/0102377 A1, and US 2006/0102378 A1, the disclosures of which are incorporated herein by reference for their teachings on making and using metal matrix composite wires.

Wires comprising polymers and fiber may be made, for example, by pultrusion processes which are known in the art. One example of a fiber reinforced polymer is provided, for example, in PCT application having publication No. WO 2003/091008A, published Nov. 6, 2003 and PCT application publication having publication No. WO 2005/040017A, published May 6, 2005. Pultrusion methods are further described, for example, in ASM Handbook Vol. 21, Composites, pp. 550-564 (ASM International, Metals Park, Ohio), published in 2001, the disclosure of which is incorporated herein by reference Typically, fibers for polymeric matrix composites include aramid fibers, boron fibers, carbon fibers, ceramic fibers, graphite fibers, poly(p-phenylene-2,6-benzobisoxazole), tungsten fibers, and shape memory alloy fibers.

In some embodiments, at least 85% (in some embodiments, at least 90%, or even at least 95%) by number of the fibers in the core are continuous.

Referring again to FIG. 1, each of first, second, and third cables 26, 28, 30 has a rated breaking strength, where an ultimate tensile strength of cables 26, 28, 30 is greater than or equal to the rated breaking strength. In general terms, the rated breaking strength is determined by a calculation to define a minimum acceptable strength of a cable (see Standard Reference ASTM B232, published in 2005).

In one exemplary embodiment, transmission cable 12, including splices 32, 34 and the composite wire(s) forming the transmission cable 12, is susceptible to damage, including breakage of the longitudinal reinforcing fibers of the composite wires, according to the following: an amount of tension exerted on transmission cable 12; a diameter of transmission cable 12; a bend radius of transmission cable 12 about a sheave; a composition of cable 12, including types of matrix materials, fiber materials, relative amount of fiber material, and others; and a break over angle (described in greater detail below) of transmission cable 12 over the sheave.

Along these lines, in one exemplary embodiment, electrical transmission cable 12, including each of first, second, and third cables 26, 28, 30 has an associated minimum sheave diameter. In particular, the associated minimum sheave diameter corresponds to a minimum bend radius of transmission cable 12 while under no mechanical load that can be imparted on transmission cable 12 with no significant damage to the transmission cable 12. Under mechanical load, the minimum bend radius of transmission cable 12 is a function of the tension and actual break-over angle of transmission cable 12 over a sheave. As tension and break over angle increase, the minimum bend radius for the transmission cable 12 increases. As such, sheave diameter is optionally chosen to be large enough with this in mind, and larger than the minimum sheave diameter. It should be noted that sheave diameter is also typically bounded by physical constraints, such as a person's ability to lift the sheave during installation or other installation requirements.

In one exemplary embodiment, each of first and second splices 32, 34 is a flexible, full tension splice. In general terms, a "flexible" splice is able to be bent or curved, for example, bending associated with being pulled over one or more sheave assemblies, with no significant damage to transmission cable 12, including splices 32, 34. This is to be contrasted with rigid splices, such as compression splices formed by compressing a steel sleeve onto a core of a length of transmission cable, and then compressing an aluminum sleeve over the steel sleeve and portions of the transmission cable proximate the aluminum sleeve. In general terms, such rigid splices are incapable of being pulled over one or more sheave assemblies with no significant bending damage to the rigid splice and/or damage to the transmission cable joined with the rigid splice. In particular, a rigid splice pulled over a sheave assembly is permanently deformed or bent after being pulled over a sheave assembly. For additional reference, a "full tension" splice is generally one that is capable of withstanding a tension comparable to the rated breaking strength of transmission cable 12.

With reference to FIGS. 2A-2C, in one exemplary embodiment first splice 32 is a full tension, flexible splice. For example, the first splice 32 is optionally a formed-wire type splice. In particular, first splice 32 includes a plurality of helically wound inner rods 50 wrapped about trailing end 38 of first cable 26 and leading end 40 of second cable 28, and a plurality of helically wound outer rods 52 wrapped about the plurality of inner rods 50. With reference to FIG. 2B, groups of three, four, or a desired number of inner rods 50 are sequentially applied to first and second cables 26, 28 until a desired number of inner rods 50 are disposed about first and second cables 26, 28. With reference to FIG. 2C, groups of three, four, or a desired number of outer rods 52 are sequentially applied over the plurality of inner rods 50 until a desired number of outer rods 52 are disposed about the plurality of inner rods 50. The pluralities of inner and outer rods 50, 52 are optionally formed of aluminum alloy.

As referenced above, suitable splices include flexible, full tension splices, such as formed-wire type splices, including those available from Preformed Line Products of Cleveland, Ohio, under the trade designation "THERMOLIGN" (part number of TLSP-795). In one exemplary embodiment, the splice 32 is large enough to dissipate heat efficiently. Transmission cable formed with composite wires is typically designed to run at high temperatures (e.g., greater than about 200° C.) in comparison to cable having steel core wires (e.g., greater than about 100° C. A larger splice is able to help keep the temperature of the splice relatively low. Thus, the splice 32 is optionally composed of two layers of helical rods to add additional heat sink capability to the splice 32. Although suited as a heat sink, the ability of flexible, full tension splices of the transmission cable 12 to safely pass over a sheave is a surprising result due to past experience with damage to other types of splices (e.g., wire mesh connectors). Additionally, successful use of a dual-layer splice configuration is further surprising as the dual-layer configuration is otherwise indicative of concentrated bending forces at the edges of the splice, rendering the successful results achieved even more surprising.

Again, referring to FIGS. 2A-2C, in one exemplary embodiment, second splice 34 is formed in a substantially similar manner to first splice 32, although first and second splices 32, 34 are optionally substantially different in form.

With reference to FIG. 1, tensioner 14 is optionally of a type known in the art and generally serves to maintain a reel of transmission cable 12, also described as a reel length of cable. In particular, tensioner 14 is adapted to pay out transmission cable 12 under tension, for example, using a braking mechanism, to avoid unwinding transmission cable 12 from a reel too quickly. Also, tension may need to be increased during pulling in order to reduce cable sag in order for the transmission cable 12 to clear obstacles or maintain required clearance levels (e.g., over highways). For reference, each of first, second, and third cables 26, 28, 30 optionally corresponds to a reel length of transmission cable 12, in one exemplary embodiment, although other lengths are also contemplated.

First sheave assembly 16 is maintained by first suspension tower 18, for example, hanged from first suspension tower 18, and generally includes an array of sheaves 56 adapted to support transmission cable 12 and disposed along an arc (e.g., 45 degree arc) to define an overall radius of curvature $R_1$ over array of sheaves 56. In this manner, array of sheaves 56 is optionally used to provide a relatively large radius for transmission cable 12 to travel over without having to provide a single, relatively large diameter sheave. In one exemplary embodiment, each of sheaves 56 has a diameter of about 7 inches with array of sheaves 56 defining an overall radius of curvature $R_1$ of about 60 inches. It should also be noted that first sheave assembly 16 is optionally mounted to first suspension tower 18, or other appropriate structure, in such a manner that the entire first sheave assembly 16 is able to pivot to accommodate various lines of entry and exit of transmission cable 12 from first sheave assembly 16, as will be described in greater detail below. In one exemplary embodiment, first suspension tower 18 is of a type known in the art (e.g., a metal framework tower).

Second sheave assembly 20 is maintained by second suspension tower 22, for example, hanged from second suspension tower 22, and generally includes sheave 58. In one exemplary embodiment, sheave 58 has a diameter of about 36 inches, although other dimensions are contemplated. From this, it follows that sheave 58 optionally defines an overall radius of curvature, for example, of about 18 inches. It should also be noted that second sheave assembly 20 is optionally mounted to second suspension tower 22 or other appropriate structure in such a manner that the entire second sheave assembly 20 is able to pivot to accommodate various lines of entry and exit of transmission cable 12 from second sheave assembly 20, as will be described in greater detail below. In one exemplary embodiment, second suspension tower 22 is of a type known in the art (e.g., a metal framework tower). It should also be noted that subsequent sheave assemblies (not shown) to first and second sheave assemblies 16, 20 are also contemplated.

Tugger 24 is optionally of a type known in the art and generally serves to pull transmission cable 12 from tensioner 14. In particular, tugger 24 is adapted to exert a tension on transmission cable 12, to pull transmission cable 12 over first and second sheave assemblies 16, 20, or additional sheave assemblies as desired.

In terms of relative position, tensioner 14 is optionally spaced laterally apart from first sheave assembly 16 a distance of about three times a height at which the first sheave assembly 16 is maintained. In turn, in one exemplary embodiment, first and second sheave assemblies 16, 20 are spaced apart to define a lateral span, or span distance, in a range from about 200 feet to about 1600 feet, although other dimensions are contemplated, including from about 200 feet to about 600 feet, about 600 feet to about 1500 feet, or even from about 1200 feet to about 1600 feet, for example. Furthermore, additional, subsequent sheave assemblies/towers optionally define a similar span distance, or other span distance as particular applications require. Tugger 24 is optionally spaced laterally apart from second sheave assembly 20 a distance of about three times a height at which second sheave assembly 20 is maintained, although other dimensions are also contemplated.

With reference to FIG. 1, and in view of the above, a method of installing transmission cable 12 includes guiding leading end 36 of first cable 26 over first sheave assembly 16 and pulling first cable 26 over first sheave assembly 16. In one exemplary embodiment, a suitable leader (not shown) is attached to leading end 36 of first cable 26, the leader then being pulled by tugger 24 to pull first cable 26 directly from a reel maintained by tensioner 14 over first sheave assembly 16.

As shown by the dotted line, transmission cable 12 defines a line of entry with first sheave assembly 16 at a tangent line to transmission cable 12 where transmission cable 12 first enters, or first travels over, first sheave assembly 16. In turn, transmission cable 12 defines a line of exit with first sheave assembly 16 at a tangent line to transmission cable 12 wherein transmission cable 12 exits, or no longer travels over first sheave assembly 16. An angle between the line of entry and the line of exit at first sheave assembly 16 is described as a first break-over angle $\alpha$ of transmission cable 12 over first sheave assembly 16. In one exemplary embodiment, the larger overall radius of curvature $R_1$ is advantageous as the first break-over angle $\alpha$ is relatively high. In particular, tensioner 14 from which transmission cable 12 is directly fed to first sheave assembly 16 is often at a much lower height than first sheave assembly 16 and is also spaced laterally a relatively small distance from first sheave assembly 16 in comparison to the span distance between first and second sheave assembly 16, 20, for example. As a result, a relatively high angle of entry into first sheave assembly 16 is often encountered.

Once tensioner 14 has paid out first cable 26 to trailing end 38, second cable 28 is optionally spliced, or joined, to first cable 26 with first splice 32 being a flexible, full tension splice as reference above. In one exemplary embodiment, second cable 28 is optionally maintained on a separate reel from first cable 26, with leading end 40 of second cable 28 being joined to trailing end 38 of first cable 26 once first cable 26 has been paid out to trailing end 38.

In one exemplary embodiment, first cable 26 is pulled over first sheave assembly 16 to the trailing end 38 of first cable 26 until first splice 32 is ultimately pulled over first sheave assembly 16, for example, to the position where second splice 34 is shown in FIG. 1. First splice 32 is pulled over first sheave assembly 16 at the first break-over angle $\alpha$ and with an associated tension being exerted on first splice 32 and first and second cables 26, 28. In one exemplary embodiment, first splice 32 is pulled over first sheave assembly 16 with the first break-over angle $\alpha$ in a range from about 10 degrees to about 40 degrees and at a tension in a range from about 5% to about 20% of the rated breaking strengths (RBS) of each of the first and second cables 26, 28. It should be noted that other first break-over angles $\alpha$ and tensions are also contemplated. Although first splice 32 is flexible, some risk of damage may be further avoided by increasing the overall radius of curvature $R_1$ to reduce an amount of bending of first splice 32. For example, the radius of curvature $R_1$ is optionally selected to be substantially greater than half of the minimum sheave diameter of transmission cable 12.

The method also includes guiding leading end 36 of first cable 26 from first sheave assembly 16 over second sheave assembly 20 and pulling first cable 26 over second sheave assembly 20 to trailing end 38 of first cable 26 to first splice 32. As shown by the dotted line, transmission cable 12 defines a line of entry with second sheave assembly 20 at a tangent line to transmission cable 12 where transmission cable 12 first enters, or first travels over, second sheave assembly 20. After transmission cable 12 has traversed second sheave assembly 20, transmission cable 12 defines a line of exit with second sheave assembly 20 at a tangent line to transmission cable 12 where transmission cable 12 exits, or no longer travels over second sheave assembly 20.

An angle between the line of entry and the line of exit of transmission cable 12 at second sheave assembly 20 is described as a second break-over angle $\beta$ of transmission cable 12 over second sheave assembly 20. In one exemplary embodiment, the overall radius of curvature of sheave 58 need not be as large as the overall radius of curvature $R_1$ of the array of sheaves 56 to ensure that first splice 32 is not bent through too small of a radius. In particular, where the second sheave assembly 20 is located between the first sheave assembly 16 and a subsequent, third sheave assembly (not shown), the second break-over angle $\beta$ is often lower than the first break-over angle $\alpha$ as transmission cable 12 is fed into second sheave assembly 20 from first sheave assembly 16, which is often at a more comparable height to second sheave assembly 20 in comparison to a relative height of tensioner 14, and would feed out to the third sheave assembly which would also be at a more comparable height to the second sheave assembly 20. In other words, the "tower-to-tower," or "sheave-to-sheave," angles are typically much smaller than the first "ground-to-tower," or "ground-to-sheave," angle and the last "tower-to-ground," or "sheave-to-ground," angle.

First cable 26 is optionally pulled over first sheave assembly 16 to trailing end 38 and first splice 32 is pulled over second sheave assembly 20, for example, to the position represented generally in FIG. 1. First splice 32 is pulled over second sheave assembly 20 at the second break-over angle β and with an associated tension being exerted on first and second cables 26, 28. In one exemplary embodiment, first splice 32 is pulled over second sheave assembly 20 at a second break-over angle β in a range from about 10 degrees to about 40 degrees and at a tension in a range from about 5% to about 20% of the rated breaking strengths (RBS) of each of first and second cables 26, 28. It should be noted that other second break-over angles β and tensions are also contemplated. Although first splice 32 is flexible, some risk of damage may be further avoided by increasing the overall diameter of sheave 58 to reduce an amount of bending of first splice 32. In one exemplary embodiment, the diameter of sheave 58 of second sheave assembly 20 is selected to be substantially greater than the minimum sheave diameter of transmission cable 12.

Although first splice 32 is shown as being pulled over two sheave assemblies, in one exemplary embodiment first splice 32 is pulled over additional sheave assemblies, for example, sheave assemblies substantially similar to first or second sheave assemblies 18, 20. Additionally, in one exemplary embodiment, second splice 34 is formed between second and third cables 28, 30 in a substantially similar manner to that described in association with first splice 32. Additionally, second splice 34 is optionally pulled over first sheave assembly 16, second sheave assembly 20, or any number of subsequent sheave assemblies, in a substantially similar manner to that described in association with first splice 32.

The system and method described above provide various advantages. For example, a permanent, flexible, full-tension splice is employed between lengths of cable, rather than pulling transmission cable 12 using temporary mechanical connectors, such as wire mesh grips, also described as sock splices. In this manner, a permanent splice need not be installed at some later time, reducing installation steps and increasing efficiency. Furthermore, problems associated with installation of permanent splices following positioning of the cable are reduced, for example, where the installer of transmission cable 12 does not have the necessary field access required to install a splice mid-span between sheave assemblies.

As referenced above, cables including composite wires are particularly useful in overhead electrical power transmission cables. Transmission cable 12 according to the present invention may be homogeneous (i.e., including only one type of composite wire) or nonhomogeneous (i.e., including a plurality of secondary wires, such as metal wires). As an example of a nonhomogeneous cable, a core of transmission cable 12 can include a plurality of composite wires including longitudinally positioned reinforcing fibers with an outer shell that includes a plurality of secondary wires (e.g., aluminum wires). Cables according to the present invention can include metal matrix material or polymer matrix material composite wires, for example.

Additionally, cables according to the present invention can be stranded. A stranded cable typically includes a central wire and a first layer of wires helically stranded around the central wire. Cable stranding is a process in which individual strands of wire are combined in a helical arrangement to produce a finished cable (see, e.g., U.S. Pat. No. 5,171,942 (Powers) and U.S. Pat. No. 5,554,826 (Gentry)). The resulting helically stranded wire rope provides far greater flexibility than would be available from a solid rod of equivalent cross sectional area. The helical arrangement is also beneficial because the stranded cable maintains its overall round cross-sectional shape when the cable is subject to bending in handling, installation and use. Helically wound cables may include as few as 7 individual strands to more common constructions containing 50 or more strands.

Figure 3:
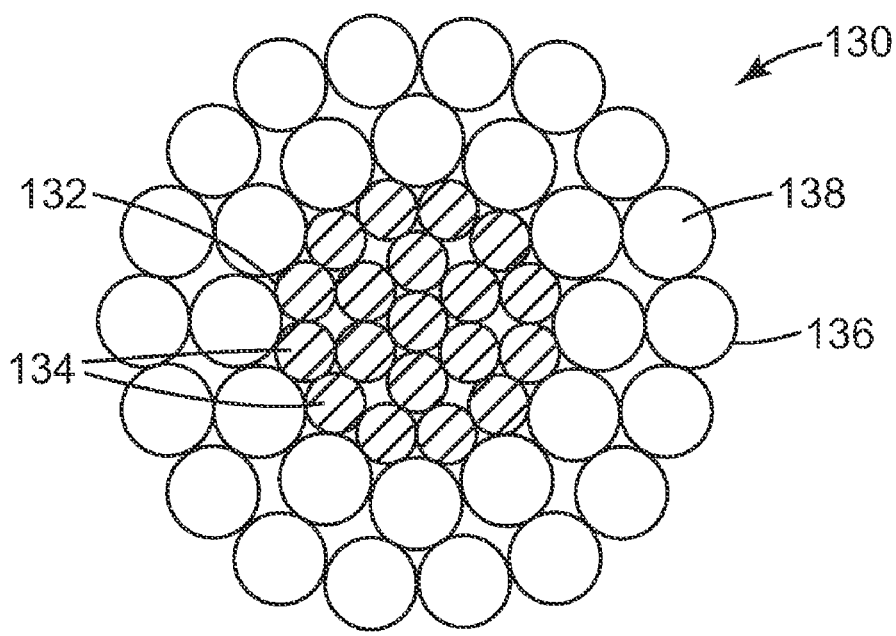
FIGS. 3 and 4 are schematic, cross-sections of two exemplary embodiments of overhead electrical power transmission cables having cores of composite wires.
Figure 4:
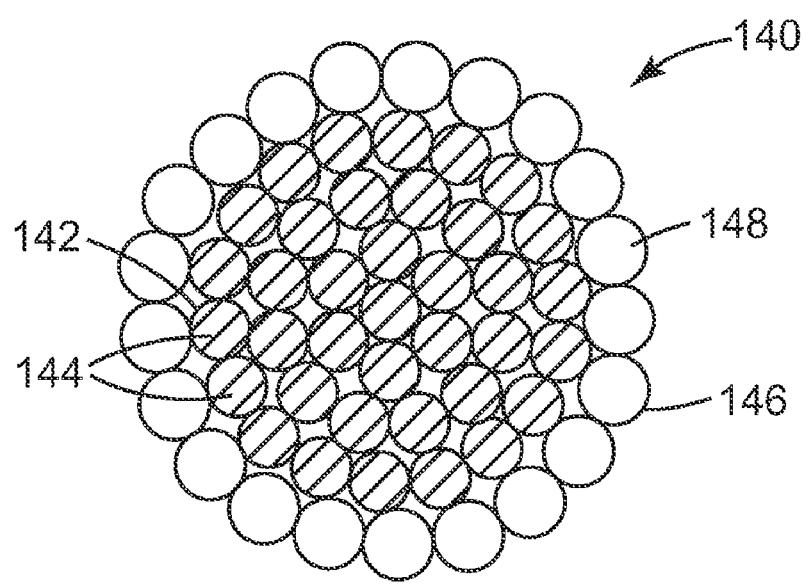

One exemplary electrical power transmission cable, or transmission cable, according to the present invention is shown in FIG. 3, where electrical power transmission cable according to the present invention 130 may be core 132 of nineteen individual composite (e.g., metal matrix composite) wires 134 surrounded by jacket 136 of thirty individual metal wires (e.g., aluminum or aluminum alloy wires) 138. Likewise, as shown in FIG. 4, as one of many alternatives, overhead electrical power transmission cable according to the present invention 140 may be core 142 of thirty-seven individual composite (e.g., metal matrix composite) wires 144 surrounded by jacket 146 of twenty-one individual metal (aluminum or aluminum alloy) wires 148.

Figure 5:
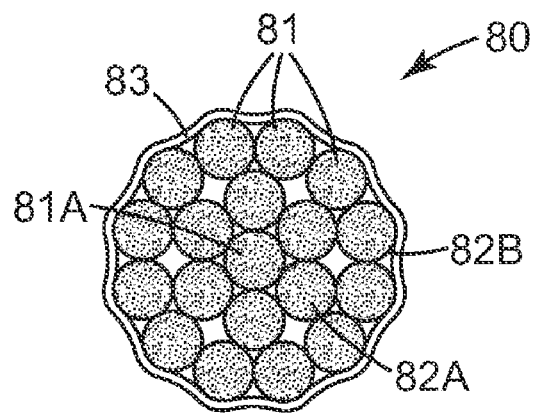
FIG. 5 is an end view of an exemplary embodiment of a stranded cable with a maintaining means around the plurality of strands.

FIG. 5 illustrates yet another exemplary embodiment of stranded cable 80. In this embodiment, the stranded cable includes central composite (e.g., metal matrix composite) wire 81A and first layer 82A of composite (e.g., metal matrix composite) wires that have been helically wound about central composite (e.g., metal matrix composite) wire 81A. This embodiment further includes a second layer 82B of composite (e.g., metal matrix composite) wires 81 that have been helically stranded about first layer 82A. Any suitable number of composite (e.g., metal matrix composite) wires 81 may be included in any layer. Furthermore, more than two layers may be included in stranded cable 80 if desired.

Cables according to the present invention can be used as a bare cable or they can be used as the core of a larger diameter cable. Also, cables according to the present invention may be a stranded cable of a plurality of wires with a maintaining means around the plurality of wires. The maintaining means may be a tape overwrap (see, e.g., tape overwrap 83 shown in FIG. 5), with or without adhesive, or a binder.

Stranded cables according to the present invention are useful in numerous applications. Such stranded cables are believed to be particularly desirable for use in overhead electrical power transmission cables due to their combination of low weight, high strength, good electrical conductivity, low coefficient of thermal expansion, high use temperatures, and resistance to corrosion.

Figure 6:
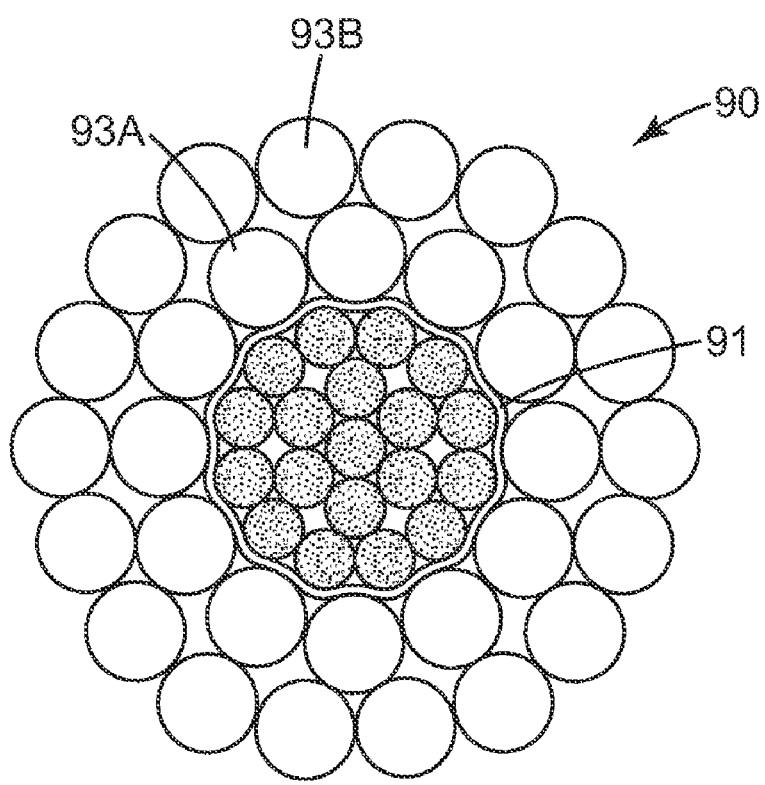
FIG. 6 is an end view of an exemplary embodiment of an electrical transmission cable.

An end view of one exemplary embodiment of such a transmission cable is illustrated in FIG. 6 as transmission cable 90. Transmission cable 90 includes core 91 which can be any of the stranded cores described herein. Power transmission cable 90 also includes at least one conductor layer about stranded core 91. As illustrated, power transmission cable includes two conductor layers 93A and 93B. More conductor layers may be used as desired. In some embodiments, each conductor layer comprises a plurality of conductor wires. Suitable materials for the conductor wires include aluminum and aluminum alloys. The conductor wires may be stranded about stranded core 91 by suitable cable stranding equipment as is known in the art.

In other applications, in which the stranded cable is to be used as a final article itself, or in which it is to be used as an intermediary article or component in a different subsequent article, it is desirable that the stranded cable be free of electrical power conductor layers around plurality of metal matrix composite wire 81.

Additional details regarding cables made from composite wires are disclosed, for example, in U.S. Pat. No. 6,180,232 (McCullough et al.), U.S. Pat. No. 6,245,425 (McCullough, et al.), U.S. Pat. No. 6,329,056 (Deve, et al.), U.S. Pat. No. 6,336,495 (McCullough et al.), U.S. Pat. No. 6,344,270 (McCullough et al.), U.S. Pat. No. 6,447,927 (McCullough et al.), U.S. Pat. No. 6,460,597 (McCullough et al.), U.S. Pat. No. 6,485,796 (Carpenter et al.), U.S. Pat. No. 6,544,645 (McCullough et al.), U.S. Pat. No. 6,559,385 (Johnson et al.), U.S. Pat. No. 6,692,842 (McCullough et al.), U.S. Pat. No. 6,723,451 (McCullough et al.), U.S. Pat. No. 6,796,365 (McCullough et al.), U.S. Pat. No. 6,913,838 (McCullough et al.), U.S. Pat. No. 7,131,308 (McCullough et al.), U.S. Pat. No. 7,093,416 (Johnson et al.); and U.S. Pat. Application Publication No. US 2004/0190733 A1, US 2005/0181228 A1, US 2006/0102377 A1, and US 2006/0102378 A1; and PCT applications having publication Nos. WO 97/00976, published May 21, 1996, WO 2003/091008A, published Nov. 6, 2003, and WO 2005/040017A, published May 6, 2005. Aluminum matrix composite containing cables are also available, for example, from 3M Company under the trade designation "795 kcmil ACCR".

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

Figure 7:
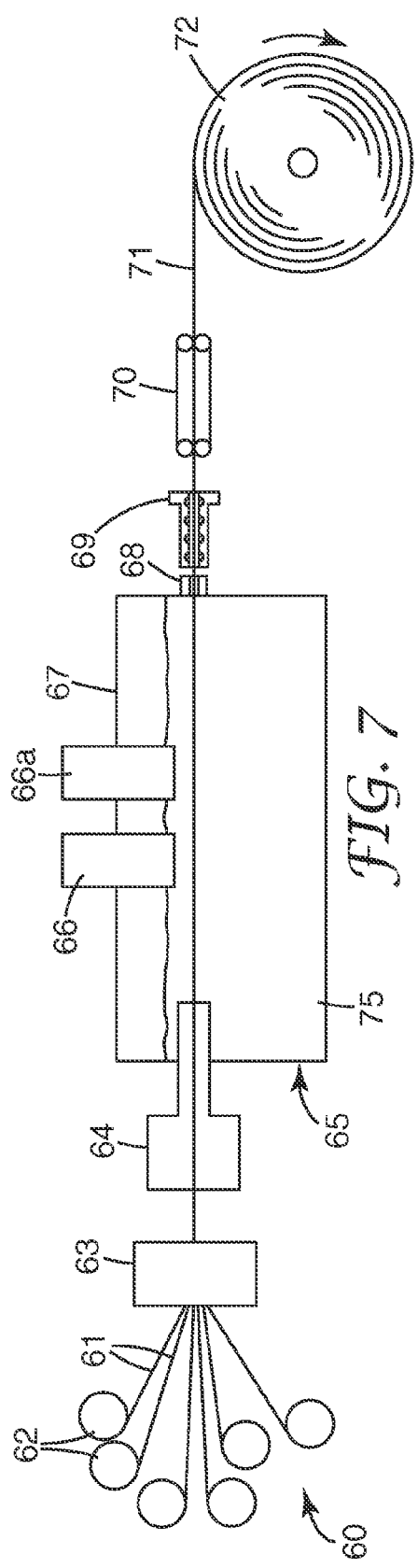
FIG. 7 is a schematic view of an exemplary ultrasonic infiltration apparatus used to infiltrate fibers with molten metals in accordance with the present invention.

The wire for Example 1 cable was prepared as follows. The wire was made using apparatus 60 shown in FIG. 7. Seven (7) tows of 10,000 denier alpha alumina fiber (marketed by the 3M Company, St. Paul, Minn. under the trade designation "NEXTEL 610") were supplied from supply spools 62, collimated into a circular bundle, and heat-cleaned by passing through 3 meters (9.8 foot) long alumina tube 63 heated to 1100° C. at 549 cm/min (216 in./min). Heat-cleaned fibers 61 were then evacuated in vacuum chamber 64 before entering crucible 65 containing melt (molten metal) 75 of metallic aluminum (99.99% Al) matrix material (obtained from Beck Aluminum Co., Pittsburgh, Pa.). The fibers were pulled from supply spools 62 by caterpuller 70. Ultrasonic probes 66, 66A were positioned in melt 75 in the vicinity of the fiber to aid in infiltrating melt 75 into tows of fibers 61. The molten metal of wire 71 cooled and solidified after exiting crucible 65 through exit die 68, although some cooling likely occurred before wire 71 fully exited crucible 65. Further, cooling of wire 71 was enhanced by streams of air delivered through cooling device 69 that impinged on wire 71 at a flow rate of 160 liters per minute. Wire 71 was collected onto spool 72.

Fibers 61 were evacuated before entering melt 75. The pressure in the vacuum chamber was about 200 millitorr. Vacuum system 64 had a 25 cm long alumina entrance tube sized to match the diameter of the bundle of fiber 61. Vacuum chamber 64 was 21 cm long, and 10 cm in diameter. The capacity of the vacuum pump was 0.37 m³/minute. The evacuated fibers 61 were inserted into the melt 75 through a tube on the vacuum system 64 that penetrated the metal bath (i.e., the evacuated fibers 61 were under vacuum when introduced into the melt 75). The inside diameter of the exit tube matched the diameter of the fiber bundle 61. A portion of the exit tube was immersed in the molten metal to a depth of 3 mm (0.125 inch).

Infiltration of the molten metal 75 into the fibers 61 was enhanced by the use of vibrating horns 66, 66A positioned 19.8 cm (7.8 inch) apart, and 3.2 cm (1.25 inch) into the molten metal 75 so that the horns were in close proximity to the fibers 61. Horns 66, 66A were driven to vibrate at 19.7 kHz and an amplitude in air of 0.018 mm (0.0007 inch). Horn 66, 66A were connected to titanium waveguides (machined from 31.8 mm (1.25 inch) diameter titanium Ti6-4 rod stock from Titanium Industries, Chicago, Ill.) via a heat shrink fit to another titanium waveguides (i.e., there were four titanium waveguides used) that were each (i.e., the latter two titanium waveguides) in turn connected to an ultrasonic booster (i.e., there were two ultrasonic boosters), which in turn were connected to a transducer (i.e., there were two transducers; the ultrasonic booster and ultrasonic transducer were obtained from Sonics & Materials, Danbury, Conn.).

Fibers 61 were within 1.3 mm of the horn tips with respect to the fiber centerline. The horn tips were, made of a mixture of silicon nitride and alumina ("SIALON"; obtained from Consolidated Ceramics, Blanchester, Ohio). The ceramic horn tips were fashioned into a cylinder 30.5 cm (12 inch) in length and 2.5 cm (1 inch) in diameter. The ceramic horn tips were waffled with a cross-hatched 90° "V" groove, (0.5 mm (0.020 inch) deep, with center to center distance of 0.25 cm (0.1 inch). The cylinder was tuned to the desired vibration frequency of 19.7 kHz by altering its length.

Molten metal 75 was degassed (e.g., reducing the amount of gas (e.g., hydrogen) dissolved in the molten metal) prior to infiltration. A portable rotary degassing unit (obtained from Brumund Foundry, Inc, Chicago, Ill.) was used. The gas used was Argon, the Argon flow rate was 1.05 liters per minute, the speed was provided by the air flow rate to the motor set at 50 liters per minute, and duration was 60 minutes.

Silicon nitride exit die 68 was configured to provide the desired wire diameter. The internal diameter of the exit die was 2.08 mm (0.082 inch).

The stranded core was stranded on stranding equipment at Wire Rope Company in Montreal, Canada. The cable had one wire in the center, six wires in the first layer with a left hand lay and then twelve wires in a second (outer) layer with a right hand lay. Prior to being helically wound together, the individual wires were provided on separate bobbins which were then placed in two motor driven carriages of the stranding equipment. The first carriage held the six bobbins for the first layer of the finished stranded cable and the second carriage held the twelve bobbins for the second layer of the stranded cable. The wires of each layer were brought together at the exit of the carriage and arranged over the preceding wire or layer. During the cable stranding process, the central wire, was pulled through the center of the carriage, with each carriage adding one layer to the stranded cable. The individual wires added in each layer were simultaneously pulled from their respective bobbins while being rotated about the central axis of the cable by the motor driven carriage. The result was a helically stranded core.

The stranded core was wrapped with adhesive tape using conventional taping equipment (Model 300 Concentric Taping Head from Watson Machine International, Paterson, N.J.). The tape backing was aluminum foil tape with fiberglass, and had a pressure sensitive silicone adhesive (obtained under the trade designation "FOIL/GLASS CLOTH TAPE 363" from 3M Company, St. Paul, Minn.). The total thickness of tape 18 was 0.18 mm (0.0072 inch). The tape was 1.90 cm (0.75 inch) wide.

The diameter of the finished core was nominally 10.4±0.25 mm (0.410±0.01 inch) and the lay lengths of the stranded layers were nominally 41.1 cm (16.2 inches) with a left-hand lay for the first layer and 68.8 cm (27.1 inches) with a right-hand lay for the second (outer) layer.

The aluminum alloy wires were prepared from aluminum/zirconium rod (9.8 mm (0.386 inch) diameter); obtained from Lamifil N.V., Hemiksem, Belgium, under the trade designation "ZTAL"). Minimum property requirements are for a tensile strength of 120.0 MPa (17,400 psi), an elongation of 10.0%, and an electrical conductivity of 60.5% IACS. The rods were drawn down at room temperature using five dies as is known in the art. The drawing dies (obtained from Bronson & Bratton, Burr Ridge, Ill.) were made of tungsten carbide and had an as-received highly polished die surface. The geometry of the tungsten carbide die had a 60° entrance angle, a 16-18° reduction angle, a bearing length 30% of the die diameter, and a 60° back relief angle. The die was lubricated and cooled using a drawing oil. The drawing system delivered the oil at a rate set in the range of 60-100 liters per minute per die, with the temperature set in the range of 40-50° C.

This wire was then wound onto bobbins. Various properties of the resulting wires made from the respective 6 feedstock rods are listed in Table 2, below.

TABLE 2

| Feedstock Rod From which Wire Was Made | Diameter, mm (inch) | Tensile strength, MPa (psi) | Elongation, % | Conductivity, IACS % |
|---|---|---|---|---|
| Inner Layer | | | | |
| 1 | 4.44 (0.1748) | 166.6 (24,168) | 4.9 | 60.4 |
| 2 | 4.43 (0.1744) | 170.1 (24,670) | 4.9 | 60.6 |
| 3 | 4.43 (0.1744) | 169.5 (24,586) | 5.5 | 60.3 |
| 4 | 4.43 (0.1744) | 168.4 (24,418) | 4.9 | 60.7 |
| 5 | 4.43 (0.1744) | 171.3 (24,849) | 4.9 | 60.4 |
| 6 | 4.43 (0.1744) | 174.5 (25,309) | 4.9 | 60.0 |

The cable used for sheave testing was made as a batch of eight cables, using the wires from the 6 different wires referred to in Table 2, above. There were 26 bobbins loaded into the stranding equipment, 10 wires for stranding the first inner layer, 16 wires for stranding the second outer layer, and wire was taken from a subset of these for testing, which were the "sampled bobbins".

Figure 8:
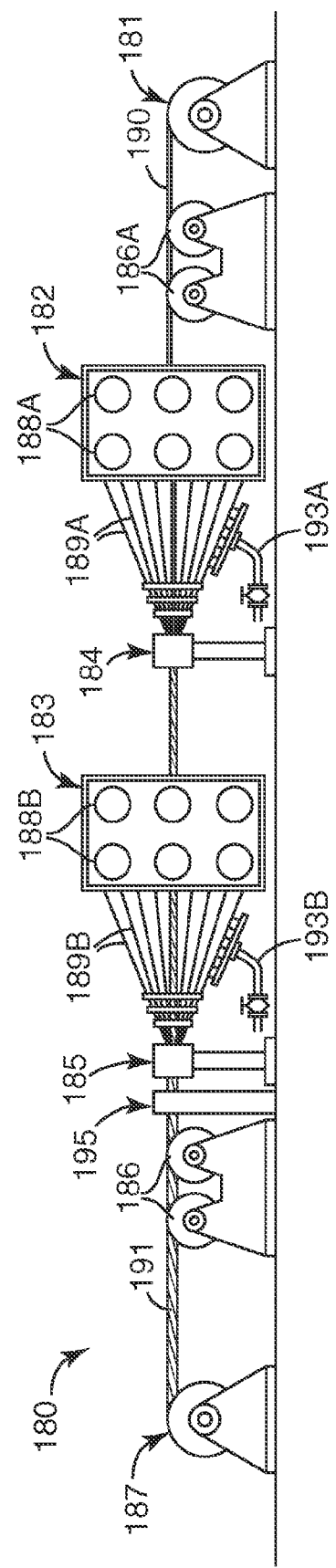
FIGS. 8, 8A, and 8B are schematic views of an exemplary stranding apparatus used to make cable in accordance with the present invention.
Figure 8A:
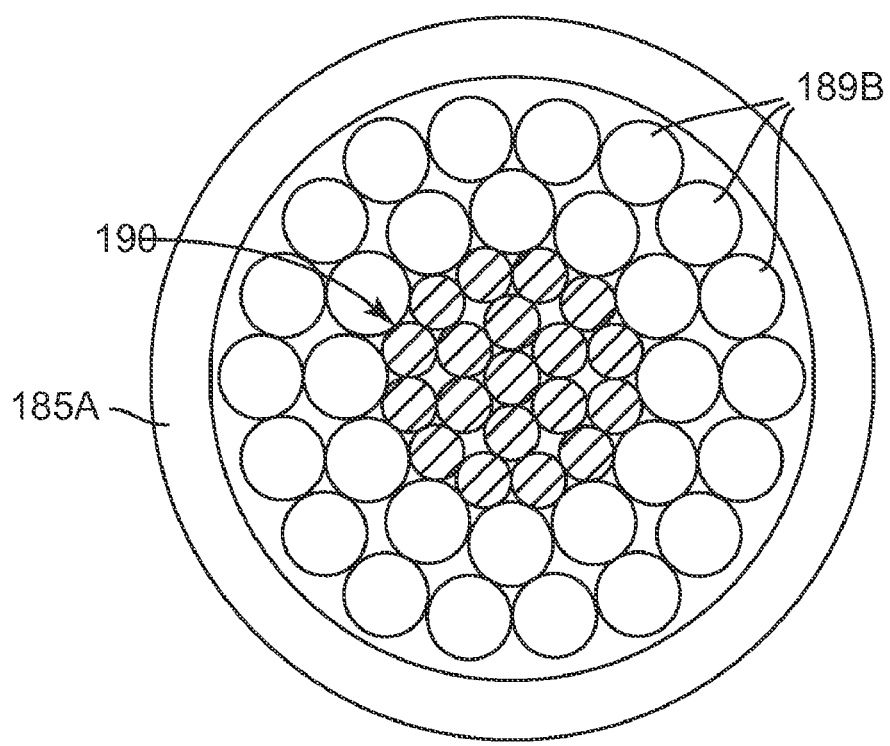
Figure 8B:
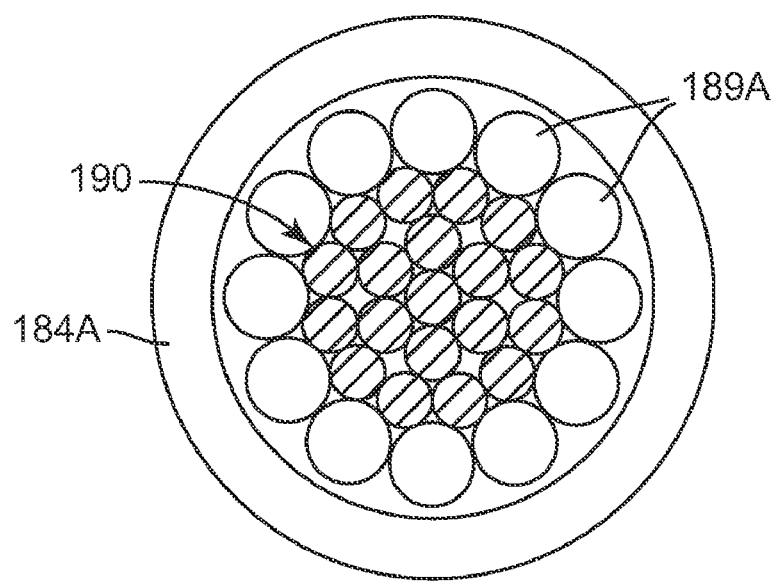

A cable was made by Nexans, Weyburn, SK, Canada, using a conventional planetary stranding machine and the core and (inner and outer) wires. A schematic of the apparatus 180 for making cable is shown in FIGS. 8, 8A, and 8B.

Spool of core 181 was provided at the head of a conventional planetary stranding machine 180, wherein spool 181 was free to rotate, with tension capable of being applied via a braking system. The tension applied to the core during payoff was 45 kg (100 lbs.). The core was input at room temperature (about 23° C. (73° F.)). The core was threaded through the center of the bobbin carriages 182, 183, through closing dies 184, 185, around capstan wheels 186 and attached to conventional take-up spool ((152 cm (60 inch diameter)) 187.

Prior to application of outer stranding layers 189, individual wires were provided on separate bobbins 188 which were placed in a number of motor driven carriages 182, 183 of the stranding equipment. The range of tension required to pull the wire 89 from the bobbins 188 was set to be in the range 11-14 kg (25-30 lbs.). Stranding stations consist of a carriage and a closing die. At each stranding station, wires 189 of each layer were brought together at the exit of each carriage at closing die 184, 185, respectively and arranged over the central wire or over the preceding layer, respectively. Thus, the core passed through two stranding stations. At the first station 10 wires were stranded over the core with a left lay. At the second station 16 wires were stranded over the previous layer with a right lay.

The core material and wires for a given layer were brought into contact via a closing die 184, 185, as applicable. The closing dies were cylinders (see FIGS. 8A and 8B) and were held in position using bolts. The dies were made of nylon and were capable of being fully closed.

The finished cable was passed through capstan wheels 186, and ultimately wound onto (107 cm diameter (42 inch)) take-up spool 187.

The inner layer consisted of 10 wires with an outside layer diameter of 0.19.3 mm (0.760 inch), a mass per unit length of the inner layer of 422 kg/km (283.2 lbs./kft.) with the left hand lay of 27.4 cm (10.8 inch). The closing blocks (made from nylon) for the inner layer were set at an internal diameter of 19.3 mm (0.760 inch). Thus the closing blocks were set at exactly the same diameter as the cable diameter.

The outer layer consisted of 16 wires with an outside layer diameter of 28.1 mm (1.106 inch), a mass per unit length of the outer aluminum layer of 691.0 kg/km (463.1 lbs./kft.) with the right hand lay of 30 cm (11.8 inch). The total mass per unit length of aluminum alloy wires was 1109 kg/km (743.6 lbs./kft.), total mass per unit length of the core was 229.0 kg/km (153.5 lbs./kft.) and the total conductor mass per unit length was 1342 kg/km (899.8 lbs./kft.). The closing blocks (made from nylon) for the outer layer were set at an internal diameter of 28 mm (1.1 inch). Thus the closing blocks were set at exactly the same diameter as the final cable diameter.

The inner wire and outer wire tension (as pay-off bobbins) was measured using a hand held force gauge (obtained from McMaster-Card, Chicago, Ill.) and set to be in the range of 13.5-15 kg (29-33 lbs.) and the core pay-off tension was set by brake using the same measurement method as the bobbins at about 90 kg (198 lbs.). Further, no straightener was used, and the cable was spooled. The core was input at room temperature (about 23° C. (73° F.)).

With reference to FIG. 9, a test fixture 200 was employed to test the resulting conductor cable 202 using the following test method. A 12.2 meter (40 feet) section of conductor cable 202 was laid out straight on the floor. A single 49 meter (160 feet) piece of low stretch rope 204 (obtained from Wall Industries, Spencer, S.C., under the trade designation "UNILINE") was attached to each end of conductor cable 202 using pull grips (not shown), forming a 61 meter (200 feet) loop. In particular, at each end of the low stretch rope, wire mesh grips were installed, and at each end of the conductor cable section, wire mesh grips were attached. The loops of the wire mesh grip at the ends of rope 204 and conductor cable 202 were brought together and attached together using a swivel coupling (not shown). The conductor cable section of the loop was then cut in half and reconnected with flexible, full tension splice 206 (obtained from Preformed Line Products, Cleveland, Ohio under the trade designation "THERMOLIGN"; part number TLSP-795).

Ends of splice 206 were taped to prevent rods of splice 206 from catching on sheave 214.

The ensuing loop of low stretch rope 204, conductor cable 202, and splice 206 were then installed on test fixture 200. Test fixture 200 consisted of three sheaves, first, fixed drive sheave 210 for driving the loop of rope 204, conductor cable 202, and splice 206 in the direction indicated by the arrows, second variable tension sheave 212 for imparting a force (F) on the loop, and third sheave 214 fitted with a load cell 216. First fixed drive sheave 210 had a diameter of 140 cm (55 inch), second variable tension sheave 212 had a diameter of 140 cm (55 inch), and third sheave 214 had a diameter of 92 cm (36 inch). Conductor cable 202 and splice 206 were pulled over third sheave 214 at a break over angle θ of 18.7 degrees at a % RBS Tension in the range of 16.3% to 17.3%.

Break over angle θ was set either by changing a position of second sheave 212 or by adjusting a length of the loop of rope 204, conductor cable 202, and splice 204. Anticipated break over angles were set in the field, and actual break over angles were later accurately measured by image processing of digital photographs of the test fixture 200. The % RBS Tension (T) on the loop was monitored using resultant force (R) measured by the load cell 216 using the equation $T=R/2 \sin(\theta/2)$. During testing, the % RBS tension fluctuated due to stretch of the loop and was adjusted with second sheave 212 during testing.

Conductor cable 202 and splice 206 were cycled over third sheave 214 by drawing the conductor cable 202 and splice 206 over third sheave 214, stopping conductor cable 202 and splice 206 prior to passing over first or second sheaves 210, 212, then removing the tension on the loop of rope 204, conductor cable 202, and splice 206, and resetting the loop. During cycling, test operators listened for any acoustic noise, such as "clicks" which would be indicative of composite wire core breakage. After twenty cycles of conductor cable 202 and splice 206 over third sheave 214, conductor cable 202 and splice 206 were disassembled and the conductor cable wires were visually inspected for damage. Visual inspection of the wires indicated there was no significant damage. Additionally, the splice 206 showed no signs of distortion or permanent deformation. No clicking or other audible cues were observed either. Hence it was concluded there was no significant damage to the cable or splice.

Example 2

The procedure described in Example 1 was followed for Example 2 with the exception that the third sheave 214 was a roller array of six 18 cm (7 inch) diameter sheaves disposed along a 45 degree arc to define an overall effective radius of 60 inches and the testing was performed with a break over angle θ of 29.6 degrees and a % RBS tension in the range of 9.7% to 11%. After three cycles over third sheave 214, conductor cable 202 and splice 206 were disassembled and the conductor cable wires were visually inspected for damage. No clicking or other audible cues were observed. Visual inspection of the wires indicated there was no significant damage. Additionally, the splice 206 showed no signs of distortion or permanent deformation. Hence it was concluded there was no significant damage to the cable or splice.

Example 3

The procedure described in Example 2 was followed for Example 3 with the exception that third sheave 214 was the same roller array of six 18 cm (7 inch) diameter sheaves with the testing performed at a break over angle of 33.8 degrees and a % RBS tension in the range of 16.6% to 17.4%. After three cycles over third sheave 214, conductor cable 202 and splice 206 were disassembled and the conductor cable wires were visually inspected for damage. No clicking or other audible cues were observed. Visual inspection of the wires indicated there was no significant damage. Additionally, the splice 206 showed no signs of distortion or permanent deformation. Hence it was concluded there was no significant damage to the cable or splice.

Example 4

The procedure described in Example 2 was followed for Example 4 with the exception that third sheave 214 was the same roller array of six 18 cm (7 inch) diameter sheaves with the testing performed at a break over angle of 39 degrees and a % RBS tension in the range of 10.1% to 10.6%. After three cycles over the test sheave, conductor cable 202 and splice 206 were disassembled and the conductor cable wires were visually inspected for damage. No clicking or other audible cues were observed. Visual inspection of the wires indicated there was no significant damage. Additionally, splice 206 showed no signs of distortion or permanent deformation. Hence it was concluded there was no significant damage to the cable or splice.

Comparative Example A

The procedure described in Example 1 was followed for Comparative Example A with the exception that third sheave 214 had a diameter of 71 cm (28 inch) with the testing performed at a break over angle of 33 degrees and a % RBS tension in the range of 8.7% to 10.1%. Additionally, there was no splice applied, the conductor cable section being continuous. Also, the loop was not unloaded and reversed after each cycle but was driven continuously around the entire loop while under the test tension. After the first cycle, an audible "click" was heard as conductor cable 202 left third sheave 214 in the region of the wire mesh grip on the trailing end of conductor cable 202. The test was stopped after 5 cycles. After five cycles over third sheave 214, conductor cable 202 was disassembled and the conductor cable wires were visually inspected for damage. Visual inspection of the wires indicated there was one broken core wire at the transition from conductor cable 202 into the wire mesh grip on the trailing end side of conductor cable 202. The remaining wires were intact and indicated no other significant damage. Hence it was concluded there was significant damage to conductor cable 202 due to the presence of the wire-mesh grip.

Comparative Example B

The procedure described in Comparative Example A was followed for Comparative Example B with the exception that although third sheave 214 had a the same diameter of 71 cm (28 inch), the testing was performed at a break over angle of 33 degrees and a % RBS tension in the range of 7.3% to 7.9%. After twenty cycles over third sheave 214, conductor cable 202 was disassembled and the conductor cable wires were visually inspected for damage. No clicking or other audible cues were observed. Visual inspection of the wires indicated there was no significant damage. Hence it was concluded there was no significant damage to the conductor cable 202.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of installing an electrical transmission cable, the method comprising:
   providing a first cable comprising at least one composite wire, the first cable having a first end and a second end;
   providing a second cable comprising at least one composite wire, the second cable having a first end and a second end, wherein each of the composite wires of the first and second cables comprises a plurality of substantially continuous, longitudinally extending fibers in a matrix material;
   joining the second end of the first cable to the first end of the second cable using a flexible, full tension splice;
   guiding the first end of the first cable over a first sheave assembly;
   pulling the first cable over the first sheave assembly to the second end of the first cable; and
   pulling the flexible, full-tension splice over the first sheave assembly.

2. The method of claim 1, wherein the plurality of substantially continuous, longitudinally extending fibers are selected from one of ceramic fibers, carbon fibers, and mixtures thereof.

3. The method of claim 1, wherein the matrix material of each of the composite wires is a metal selected from one of aluminum, titanium, zinc, tin, magnesium, and alloys thereof.

4. The method of claim 1, wherein the matrix material of each of the composite wires is a polymer.

5. The method of claim 1, wherein the flexible, full tension splice is a helical-rod, full-tension splice.

6. The method of claim 1, wherein the flexible, full tension splice is pulled over the first sheave assembly at a break-over angle in a range from about 10 degrees to about 40 degrees.

7. The method of claim 1, wherein the first and second cables are each have a rated breaking strength, and further wherein the flexible, full tension splice is pulled over the first sheave assembly at a tension in a range from about 5% to about 20% of the rated breaking strengths of each of the first and second cables.

8. The method of claim 1, wherein each of the first and second cables are free of a steel core.

9. The method of claim 1, wherein the first sheave assembly comprises an array of sheaves disposed along an arc.

10. The method of claim 1, wherein guiding the first end of the first cable over the sheave comprises:
    pulling the first and second cables along a direct path from a reel maintaining the first and second cables over the first sheave assembly.

11. The method of claim 1, further comprising:
    guiding the first end of the first cable from the first sheave assembly over a second sheave assembly, the first and second sheave assemblies spaced apart to define a span distance;
    pulling the first cable over the second sheave assembly to the second end of the first cable; and
    pulling the flexible, full tension splice over the second sheave assembly.

12. The method of claim 11, wherein the span distance is in a range from about 200 to about 1600 feet.

13. The method of claim 1, wherein the first sheave assembly defines an overall radius of curvature of at least about 36 inches.

* * * * *